United States Patent [19]

Avrea et al.

[11] Patent Number: 4,459,832

[45] Date of Patent: Jul. 17, 1984

[54] TRAILER HITCH LOCK

[76] Inventors: Walter C. Avrea, 1405 Whalers Way, Tempe, Ariz. 85283; William C. Neils, 540 W. Rose La., Phoenix, Ariz. 85013

[21] Appl. No.: 360,795

[22] Filed: Mar. 22, 1982

[51] Int. Cl.³ .................. E05B 67/36; E05B 73/00
[52] U.S. Cl. .................................. 70/14; 70/34; 70/58; 280/507
[58] Field of Search ............ 70/14, 32, 33, 34, 57, 70/58, 360, 371; 280/507, 511

[56] References Cited

U.S. PATENT DOCUMENTS

| | | | |
|---|---|---|---|
| 2,565,659 | 8/1951 | Kontra | 70/371 |
| 3,157,040 | 11/1964 | Raye | 70/57 |
| 3,769,821 | 11/1973 | Randel | 70/33 |
| 3,981,617 | 9/1976 | Milewicz | 70/371 |
| 4,208,065 | 6/1980 | Hansen | 280/507 |
| 4,291,893 | 9/1981 | Hansen | 280/507 |

Primary Examiner—Robert L. Wolfe
Attorney, Agent, or Firm—Cahill, Sutton & Thomas

[57] ABSTRACT

A pivotally mounted coupling guard, extending over a ball engaging socket of a trailer hitch to preclude disengagement of the socket from the ball, is locked in place to deter unauthorized disengagement of the socket from the ball and theft of the attached trailer. A lock module penetrably receives and locks therein essentially all of the extending ends of both the pivot pin and the retaining pin of the coupling guard to preclude unauthorized pivotal movement of the coupling guard.

17 Claims, 9 Drawing Figures

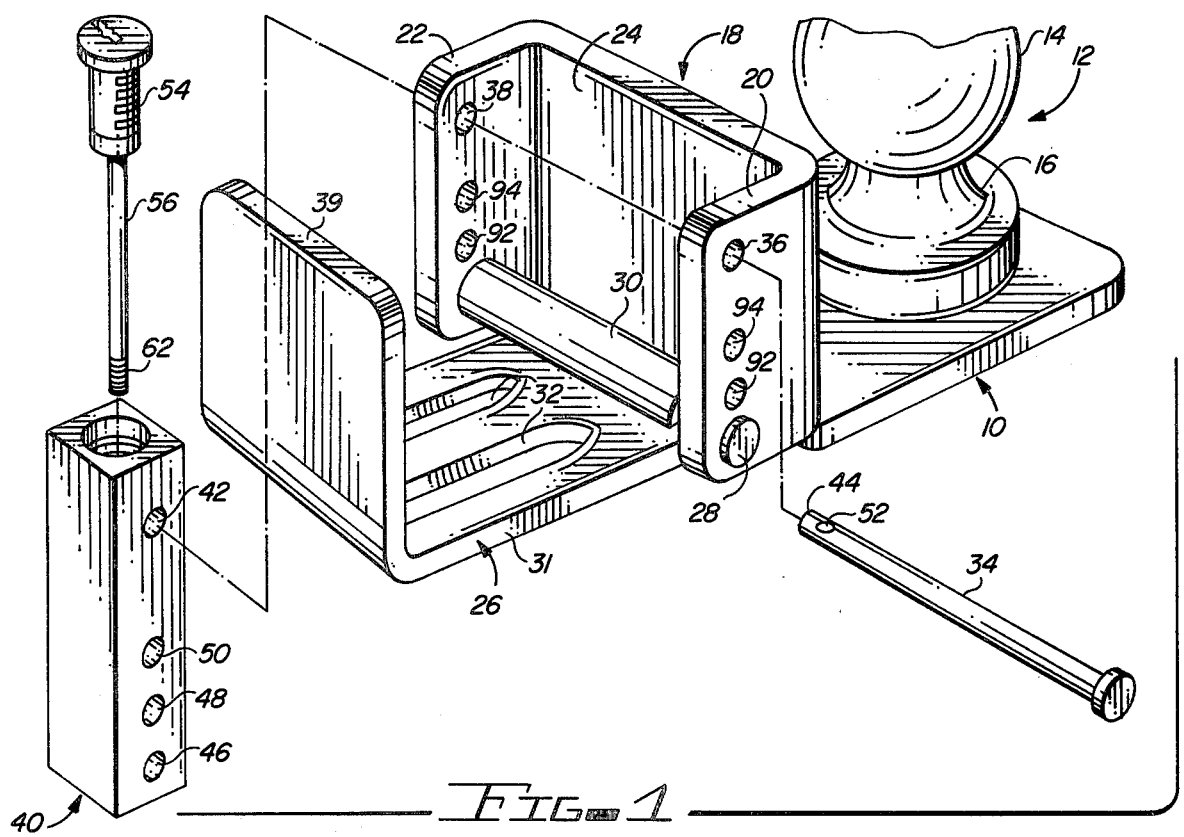

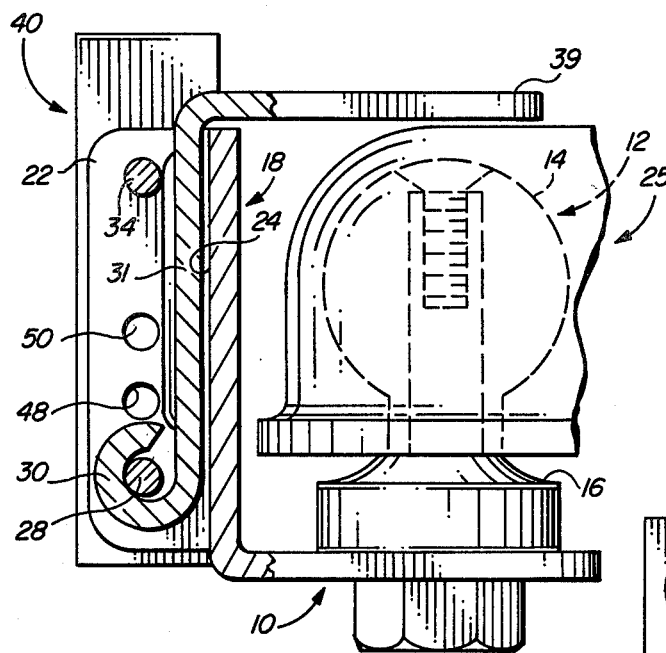
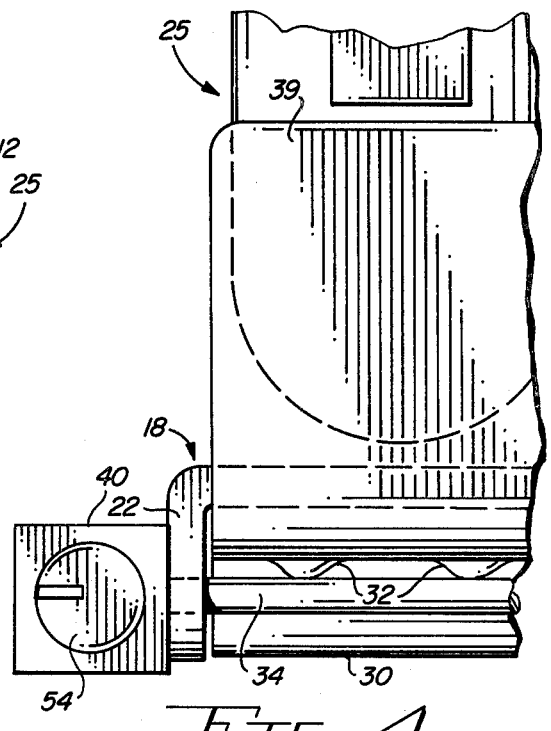
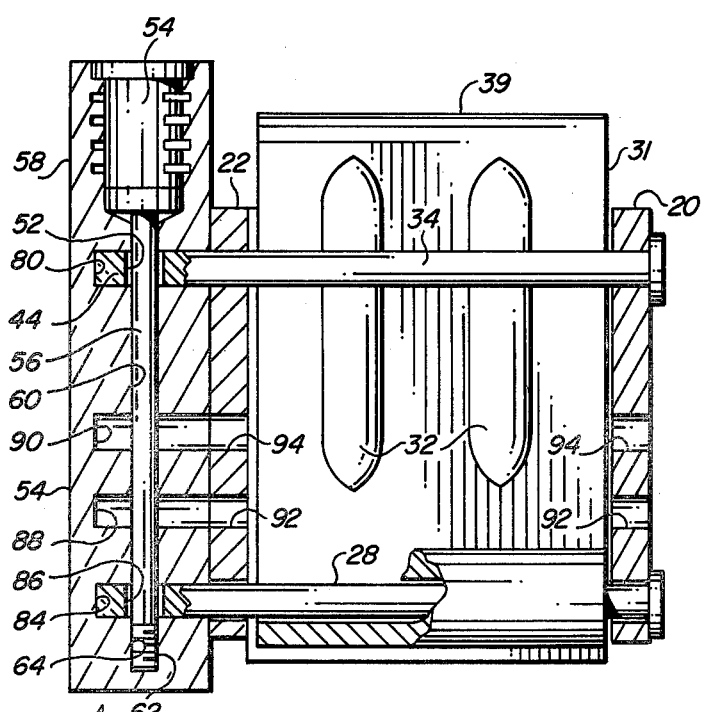
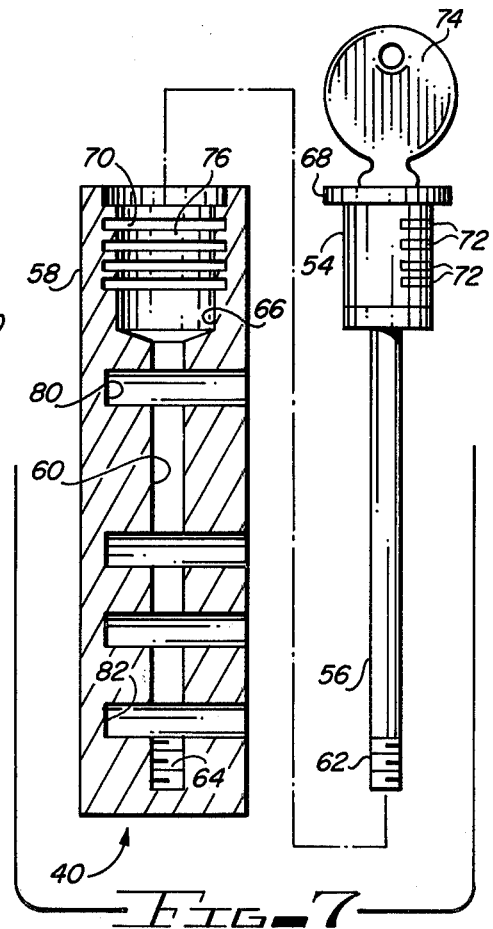

TRAILER HITCH LOCK

The present invention is an improvement over the coupling guard described in U.S. Pat. No. 4,208,065 and the ball component for coupling apparatus described in U.S. Pat. No. 4,230,336. Both of these patents are incorporated herein by reference.

A trailer hitch is a term used to denote a device for attaching a towed vehicle to a towing vehicle. The term contemplates a ball element attached to the towing vehicle and a socket for retainingly engaging the ball element and attached to a tongue or other forwardly extending protrusion from the trailer. The socket includes a spherically shaped or cupped depression for receiving a portion of the ball of the ball element and a cleat disengageably engaging the underside of the ball. Thereby, the socket is maintained locked to the ball except upon release of the cleat or in the event of breakage of the cleat or its release mechanism. Should such breakage occur, a towed vehicle or trailer may become free of the towing vehicle with consequent potentially disastrous results.

To prevent such disengagement upon breakage of the cleat or release mechanism, the coupling guard described in U.S. Pat. No. 4,208,065 may be employed. The coupling guard includes a support section pivotally attached to the base upon which the ball element is secured and a retention section extending over and above the socket. The proximity of the retention section to the socket is sufficient to preclude vertical displacement of the socket sufficient to clear the cupped ball element. Pivotal movement of the coupling guard away from the socket is precluded by a removably mounted retaining pin.

Theft of trailers by detachment from the towing vehicle is a major problem, particularly for trailer rental companies. While it is possible to lock the release mechanism of the socket and thereby prevent, or at least deter, unauthorized release of the socket from the ball element, disengagement of the ball element from the towing vehicle will accomplish the same purpose. U.S. Pat. No. 4,230,336 is directed to a ball element locking device for precluding disengagement of the ball element from the towing vehicle when a socket of a trailer is attached thereto. The ball element is primarily retained by a threaded supporting bolt extending through a base plate attached to the towing vehicle and into the ball element. A locking bolt extends into the ball element from the top part of the ball for threaded engagement with the supporting bolt. By incorporating a thread pitch difference between the supporting and the locking bolts, the supporting bolt cannot be disengaged from the ball element without first removing the locking bolt. When a socket is operatively in engagement with the ball element, access to the locking bolt is precluded and removal of the ball element from the towing vehicle is thwarted.

The present invention is directed to a lock mechanism for inhibiting disengagement of the pivot and retaining pins attendant a coupling guard of a trailer hitch to preclude unauthorized pivotal movement of the coupling guard and thereby deter disengagement of the socket from the ball element.

It is therefore a primary object of the present invention to provide a deterent against theft of a trailer hitched to a towing vehicle.

Another object of the present invention is to provide a lock for locking the socket to the ball element of a trailer hitch.

Still another object of the present invention is to provide a lockable coupling guard for precluding accidental or deliberate unauthorized disengagement of a trailer hitch.

Yet another object of the present invention is to provide an inexpensive key operated lock for securing in place a coupling guard of a trailer hitch.

A further object of the present invention is to provide a lock module for receivingly locking the pivot and retaining pins of a coupling guard.

A yet further object of the present invention is to provide a deterent against the picking of an inexpensive lock used to retain a coupling guard in place.

A still further object of the present invention is to provide a lock module useable with existing coupling guards.

These and other objects of the present invention will become apparent to those skilled in the art as the description thereof proceeds.

The present invention may be described with greater specificity and clarity with reference to the following drawings, in which:

FIG. 1 is an exploded view of the major components attendant the present invention;

FIG. 2 illustrates an isometric view of the present invention in use;

FIG. 3 is a cross-sectional view taken along lines 3—3, as shown in FIG. 2;

FIG. 4 is a partial top view;

FIG. 5 is a cross-sectional view taken along lines 5—5, as shown in FIG. 2;

FIG. 6 is a cross-sectional view 6—6, as shown in FIG. 2;

FIG. 7 is an exploded view of the lock module;

Figure 8:
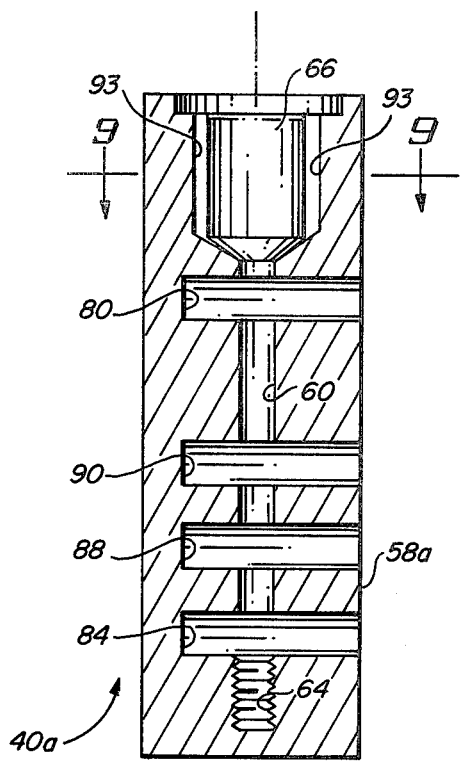
FIG. 8 is a cross-sectional view of a variant of the lock module.

Referring to FIGS. 1, 2, 3 and 4, there is shown a support base 10 for a ball element 12 having a ball 14 secured to a pedestal 16. The mounting means for the ball element may include the supporting and locking bolts described in U.S. Pat. No. 4,230,336, as shown in FIG. 3, or may include a threaded stud extending through an aperture in the support base for engagement with a lock washer and nut. A C-shaped channel extends upwardly from support base 10 and forwardly of ball element 12; it includes side members 20, 22 extending forwardly from a base 24. A socket 25 includes a spherical shaped or cupped depression for receiving a portion of ball 14 and a release mechanism 27 for operating a cleat disengageably engaging the underside of the ball.

A coupling guard 26, which may be of the type described in U.S. Pat. No. 4,208,065, is pivotally attached to side members 20, 22 by means of a pivot pin 28 extending through apertures in the side members and a sleeve 30 or similar element attached to the lower end of support section 31 of the coupling guard. Alternatively, the attachment mechanism illustrated in U.S. Pat. No. 4,208,065 or other variations may be employed. For additional strength and rigidity, ribs 32 may be developed in support section 31 of the coupling guard, as shown. A retention pin 34 is penetrably engageable with apertures 36, 38 disposed in side members 20, 22, respectively, to retain support section 31 adjacent base 24 and position retention section 39 of the coupling guard in operative engagement with ball element receiving socket 25. The ribs may be configured to serve as bearing elements against which the retention pin acts.

A lock module 40 includes an aperture 42 for receiving end 44 of retention pin 34 and apertures 46, 48 and one of which is used to receive the end of pivot pin 28. End 44 of the retention pin includes a cavity 52 extending therethrough; the end of pivot pin 28 includes a similar cavity. A lock 54 having a lock pin 56 extending therefrom is insertable within lock module 40 to penetrably and retainingly engage cavity 52 of retention pin 34 and the corresponding cavity of pivot pin 28 upon insertion of the ends of these pins into the respective apertures in the lock module.

Referring specifically to FIGS. 1, 5, 6 and 7, the structure and operation of lock module 40 will be described in further detail. The lock module includes a solid rectangular bar 58 having various cavities machined therein. A longitudinally extending cavity 60 is machined to receive lock pin 56; for reasons which will be described in further detail below, end 62 of the lock pin may be threaded and commensurate female threads 64 are disposed at the bottom of cavity 60. An enlarged cavity 66 is disposed at the upper end of cavity 60 to receive the body of lock 54 and radially expanded flange 68 thereof, if employed. A plurality of radially extended grooves 70 are configured to accommodate protrusion therein of extendable spring actuated tumblers 72 of lock 54. Such tumblers are conventional with locks of this type and remain in a spring loaded extended state until the lock is actuated (unlocked) by insertion of a key 74. Accordingly, on insertion of lock 54 and lock pin 56 within the respective cavities in bar 58, tumblers 72 will engage grooves 70 and withdrawal of the lock and lock pin is precluded except upon unlocking of the lock with key 74 and irrespective of whether the lock pin is threadedly engaged with threads in cavity 60.

The type of lock illustrated and described is relatively inexpensive and is known as a key plug or as a five disc tumbler lock. It includes five spring loaded tumblers mounted within slots extending through a cylinder. The tumblers are normally extended by action of their springs but become drawn into the cylinder upon insertion of a key. Such a lock is relatively easily picked by a skilled locksmith or lockpick. To increase the difficulty of picking lock 54, and without undertaking an additional ten fold expense of a more pick proof lock, end 62 of the lock pin is threadedly engaged with threads 64. By such threading, it therefore becomes necessary for a lockpick to not only pick the lock sufficiently cleverly to cause withdrawal of tumblers 72 but such withdrawal must be maintained while the lock and attached lock pin are rotated several revolutions to effect disengagement between end 62 and threads 64. While this is not an impossible task, it constitutes a deterrent because of the time required to pick the lock successfully. It is to be understood that grooves 70 may be made sufficiently wide to accommodate the longitudinal displacement of the lock pin during threading in order to minimize the amount by which lands 76 intermediate the grooves preclude periodic extension of tumblers 72.

Lateral cavity 80 intersects cavity 60 for receiving end 44 of retention pin 34 and is of sufficient depth to position cavity 52 in the retention pin in alignment with cavity 60 in bar 58 to permit penetration of lock pin 56 therethrough. A lateral cavity 82 is disposed in the lower end of bar 58 to receive end 84 of pivot pin 28 and locate cavity 86 disposed therethrough in aligned relationship with cavity 60 in the bar whereby lock pin 56 will penetrate cavity 86 on insertion of the lock pin. One or more additional longitudinal cavities 88, 90 may be disposed within bar 58. These further cavities are in alignment with pairs of apertures 92, 94 disposed in side members 20, 22. Depending upon the height of pedestal 16 of ball element 12 or variations in height of socket 25 engaging ball 14, coupling guard 26 may have to be raised to provide the requisite clearance between retention section 39 of the coupling guard and the socket. Accordingly, pairs of apertures 92, 94 of channel 18 permit repositioning of the pivot axis of the coupling guard and allow for vertical positional adjustment of the coupling guard.

Figure 9:
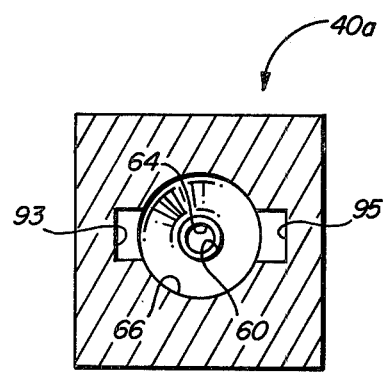
FIG. 9 is a top view taken along lines 9—9, as shown in FIG. 8.

FIGS. 8 and 9 illustrate a variant 40a of module 40 which variant will also deter a lockpick and which may be somewhat less expensive to manufacture. A pair of longitudinally oriented diametrically opposed slots 92, 94 are disposed in the wall of cavity 66 to receive tumblers 72. The resulting engagement of the tumblers will preclude rotation of an inserted lock and lock pin, except upon retraction of the tumblers by an inserted key. Without such retraction the lock pin cannot be threadedly disengaged from bar 58a.

The dimensioning of bar 58 (and bar 58a) is relatively critical in order to maintain a side of the bar in juxtaposed relationship with side member 22 and in sufficient proximity thereto to preclude the insertion of a hack saw blade or the like therebetween to sever the end of retention pin 34. Again, such positioning does not render the locking mechanism fool proof but does serve to deter most thieves. For a similar reason, the heads of both the retention pin and the pivot pin are configured to protrude a minimum amount lateral of side member 20 to provide as little purchase as possible to tools which might be used to sever the heads. Usually, the exposed part of retention pin 34 is so close to structure of the towing vehicle as to make access thereto by saws or bolt cutters very difficult and thereby deter severance of the retention pin.

It is to be understood that support base 10 may be formed as a single unit bent or welded from sheet steel to define the base and channel 18. If so formed, the unit can be welded to an appropriate supporting surface on the towing vehicle or attached thereto by the bolt or stud employed to secure ball element 12. Alternatively, channel 18 may be welded or otherwise attached directly to base 10 forming a part of the towing vehicle itself.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

We claim:

1. A lock module for positionally locking in place a pivot and retaining pin attached coupling guard of a ball and socket trailer hitch by receiving an end of at least the retaining pin of the coupling guard, said lock module comprising in combination:

(a) a lock having a plurality of laterally extendable tumblers;

(b) a lock pin attached to and extending from said lock;

(c) a bar for removably receiving said lock and lock pin, said bar including a first longitudinally oriented cavity for receiving said lock pin, a second longitudinally oriented cavity for recieving said lock means for precluding withdrawal of said lock and attached lock pin except upon retraction of the tumblers;

(d) a laterally oriented cavity disposed in said bar for receiving the end of the retaining pin, which received end includes a cavity extending therethrough, said laterally oriented cavity being located to intersect with and position said retaining pin cavity coincident with said first longitudinally oriented cavity for penetrable engagement by said lock pin upon insertion of said lock and lock pin within said bar;

(e) a further laterally oriented cavity disposed in said bar for receiving an end of the pivot pin; and (f) means for selectively retaining the pivot pin in engagement with said bar.

2. A lock module for positionally locking in place a pivot and retaining pin attached coupling guard of a ball and socket trailer hitch by receiving an end of at least the retaining pin of the coupling guard, said lock module comprising in combination:

(a) a lock having a plurality of laterally extendable tumblers;

(b) a lock pin attached to and extending from said lock;

(c) a bar for removably receiving said lock and lock pin, said bar including a first longitudinally oriented cavity for receiving said lock pin, a second longitudinally oriented cavity for receiving said lock and means for precluding withdrawal of said lock and attached lock pin except upon retraction of the tumblers;

(d) a laterally oriented cavity disposed in said bar for receiving the end of the retaining pin, which received end includes a cavity extending therethrough, said laterally oriented cavity being located to intersect with and position said retaining pin cavity coincident with said first longitudinally oriented cavity for penetrable engagement by said lock pin upon insertion of said lock and lock pin within said bar; and (e) a further laterally oriented cavity disposed in said bar for receiving an end of the pivot pin, which received end includes a cavity extending therethrough, said further laterally oriented cavity being located to intersect with and position said pivot pin cavity within said first longitudinally oriented cavity for penetratable engagement by said lock pin upon insertion of said lock and lock pin within said bar.

3. The lock module as set forth in claim 2 including at least a second one of said further laterally oriented cavity for receiving the end of the pivot pin to accommodate placement of the pivot pin in either of two locations with respect to the retaining pin.

4. The lock module as set forth in claim 3 wherein said lock pin includes a threaded section and wherein said first longitudinally oriented cavity includes a mating threaded section for threadedly engaging said lock pin.

5. The lock module as set forth in claim 4 wherein said second longitudinally oriented cavity includes a radially expanded annular groove corresponding with each tumbler of said lock.

6. The lock module as set forth in claim 1 wherein said lock pin includes a threaded section and wherein said first longitudinally oriented cavity includes a mating threaded section for threadedly engaging said lock pin.

7. The lock module as set forth in claim 6 wherein said second longitudinally oriented cavity includes a radially expanded annular groove corresponding with each tumbler of said lock.

8. The lock module as set forth in claim 4 wherein said second longitudinally oriented cavity includes a longitudinally oriented slot for receiving the tumblers of said lock.

9. The lock module as set forth in claim 8 wherein said second longitudinally oriented cavity includes a pair of diametrically opposed longitudinally oriented slots for receiving the tumblers of said lock.

10. The lock module as set forth in claim 6 wherein said second longitudinally oriented cavity includes a longitudinally oriented slot for receiving the tumblers of said lock.

11. The lock module as set forth in claim 10 wherein said second longitudinally oriented cavity includes a pair of diametrically opposed longitudinally oriented slots for receiving the tumblers of said lock.

12. A method for locking a coupling guard to a trailer hitch to preclude disengagement of a trailer socket from a ball element of a towing vehicle, said method comprising the steps of:

(a) mounting a retaining pin to retain the coupling guard adjacent the socket and prevent disengagement of the socket from the ball element;

(b) locating an end of the retaining pin within a lock module;

(c) inserting a lock pin into the lock module to engage the retaining pin end and prevent withdrawal of the retaining pin end from the lock module; and (d) locking the lock pin within the lock module.

13. The method as set forth in claim 12 wherein said locking step includes the step of threading the lock pin into the lock module prior to exercise of said locking step.

14. The method as set forth in claim 13 wherein the retaining pin end includes a cavity extending therethrough and wherein said step of inserting includes the step of penetrating the cavity with the lock pin.

15. The method as set forth in claim 12 wherein a pivot pin is employed to pivotally mount the coupling guard and including the steps of positioning an end of the pivot pin within the lock module and engaging the end of the pivot pin with the lock pin to prevent withdrawal of the pivot pin from the lock module.

16. The method as set forth in claim 15 wherein said locking step includes the step of threading the lock pin into the lock module prior to exercise of said locking step.

17. The method as set forth in claim 16 wherein each of the retaining pin and the pivot pin ends include a cavity extending therethrough and wherein said steps of inserting and engaging include the step of penetrating each of the cavities with the lock pin.

* * * * *